Dec. 15, 1959  R. E. PETRICK  2,917,619
PHOTOGRAPHIC LIGHT BAR AND CARRYING CASE
Filed March 21, 1958  2 Sheets-Sheet 1
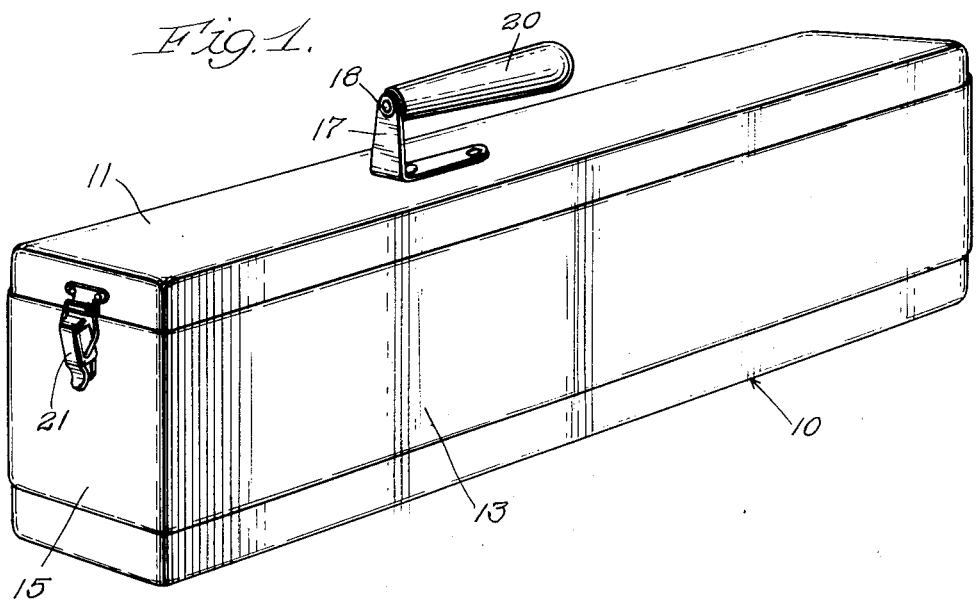
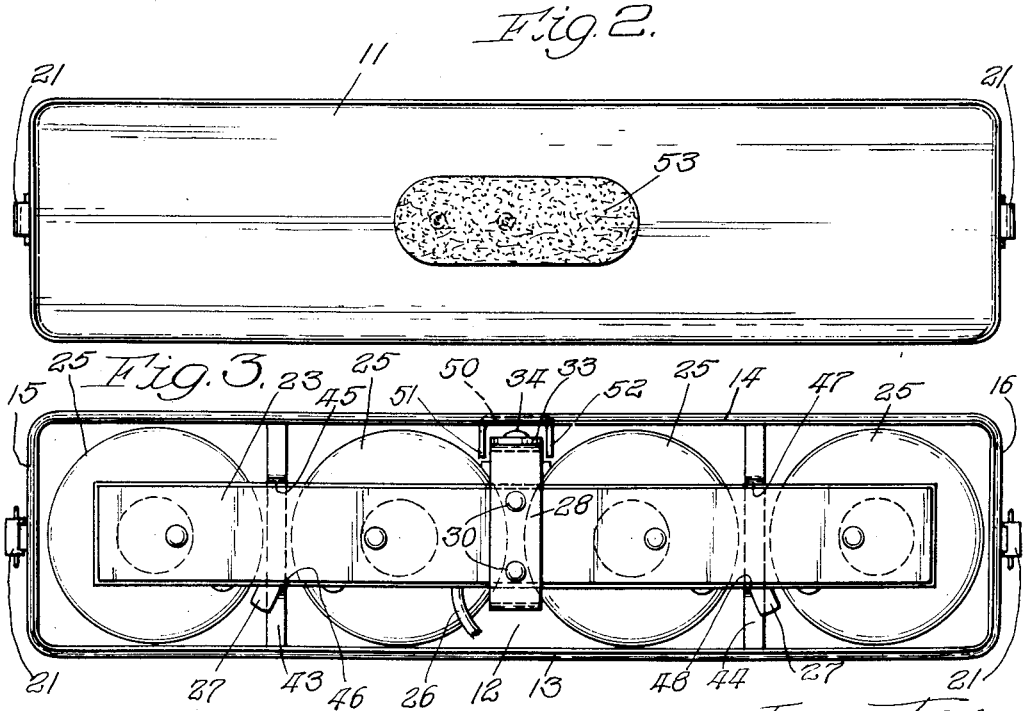
Inventor:
Russell E. Petrick,
By Schrader, Hofgren,
Brady & Wegner, Attys.

Dec. 15, 1959 R. E. PETRICK 2,917,619
PHOTOGRAPHIC LIGHT BAR AND CARRYING CASE
Filed March 21, 1958 2 Sheets-Sheet 2
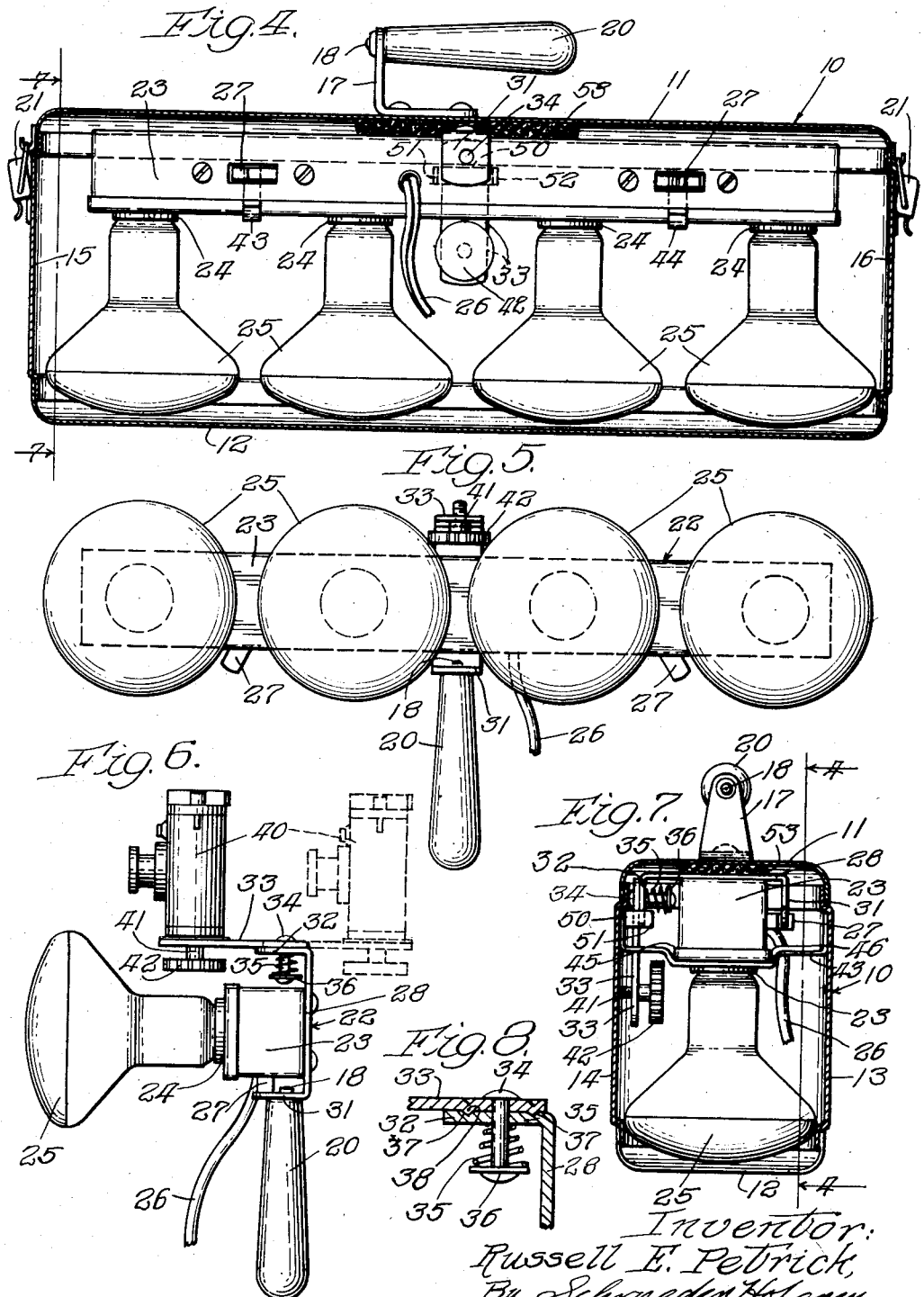

United States Patent Office 2,917,619
Patented Dec. 15, 1959

2,917,619

PHOTOGRAPHIC LIGHT BAR AND CARRYING CASE

Russell E. Petrick, Park Ridge, Ill., assignor to Knox Manufacturing Company, a corporation of Illinois Application March 21, 1958, Serial No. 723,052

12 Claims. (Cl. 240—1.3)

The present invention relates to a light bar adapted for mounting a camera and photographic flood lamps, and to a carrying case for housing the lamps in mounted position upon the light bar.

The primary object of the present invention is to provide a new and improved carrying case for compactly and securely housing a photographic light bar.

Another object is to provide a carrying case constructed and arranged to house a light bar with its photographic flood lamps mounted in operative position, the carrying case and light bar cooperating to anchor the light bar firmly against movement in the case.

A further object is to provide a light bar having an improved movable camera support for accommodating cameras adapted for front and rear mounting.

Still another object is to provide a light bar having a movable camera support adapted to be turned forwardly to cooperate with stops in the case for centering and securing the light bar against longitudinal movement in the carrying case.

Yet another object is to provide a carrying case having longitudinally spaced stops and laterally spaced shoulder portions for cooperating with the light bar to prevent movement when in carrying position.

The invention is illustrated in a preferred embodiment in the accompanying drawings, in which:

Fig. 1 is a perspective view of the carryng case for the light bar;

Fig. 2, a top plan view of the inside of the cover for the carrying case;

Fig. 3, a top plan view of the carrying case of Fig. 1 with the cover removed showing the light bar in carrying position;

Fig. 4, a sectional view taken as indicated on line 4—4 of Fig. 7;

Fig. 5, a front elevational view of the light bar removed from the carrying case with the removable handle of the carrying case inserted in the light bar;

Fig. 6, a side elevational view of the light bar removed from the carrying case, and illustrating the forward camera mounting position in full lines and the rearward camera mounting position in dotted outline;

Fig. 7, a sectional view taken as indicated on line 7—7 of Fig. 4; and

Fig. 8, a partial sectional view showing the pivotal connection between the upper arm of the camera supporting bracket and the free end portion.

In the embodiment illustrated, a rectangular carrying case, generally designated 10, is preferably formed from sheet metal and has a cover member 11 closing its open upper end. The case has a base or bottom 12 and two pairs of opposed upstanding side walls 13, 14 and 15, 16, respectively, forming an interior of the desired size.

The cover or lid 11 may have an L-shaped bracket 17 riveted to its outer face, and the free end of the bracket 17 preferably has a threaded opening to receive a threaded end 18 of a handle member 20. The removable handle 20 is a feature of the invention which will later be explained more fully, but it is sufficient to note here that it contributes to making the assembly an extremely compact unit. Conventional trunk-type fastening elements or latches 21 are provided at opposite ends of the case and cover to secure the cover 11 in place.

The light bar, generally designated 22, is best shown in Figs. 5 and 6, and is of a size to be received in the interior of the case 10. The light bar 22 includes an elongated lamp support 23 which is provided in its forward face with a number of electrical sockets 24 each adapted to receive a photographic lamp 25. As herein shown, the pairs of sockets on opposite ends of the light bar 23 are electrically connected in parallel to a cord 26 which in turn may be connected to a source of electric current, and each pair of sockets 24 may be separately actuated by a conventional electric switch 27.

The lamp support 23 is preferably provided with a camera supporting bracket 28 which may be secured to the rear face of the lamp support by a number of rivets 30. The bracket 28 may be formed in a U-shaped configuration and be provided with an arm 31 extending transversely beneath the lamp support 23. The arm 31 has a threaded opening which is adapted to receive the threaded end 18 of the handle member 20 when the handle member is removed from its cover 11. Thus the handle member 20 can be used for carrying the case 10, and also as a grasping member for a person using a camera to facilitate direction of the illumination from the photographic lamps.

The bracket 28 may also have an upper arm 32 positioned above the lamp support 23 and extending in a forward direction. The upper arm 32 of the bracket 28 terminates in a free end portion 33 which is pivotally secured to the upper arm 32 by an elongated rivet 34. The shank of the rivet is preferably embraced by a coil spring 35 which bears at its opposite ends against a washer 36 and the underside of the arm 32 so as to normally urge the abutting faces of the upper arm 32 and the free end portion 33 toward each other. In addition, the upper face of the arm 32 is provided with fore and aft recesses 37 which are spaced to receive complementary detents 38 in the lower face of the free end portion 33. Thus, when the portion 33 is swung forwardly, as shown in full lines in Fig. 6, the recesses 37 and detents 38 mutually cooperate to hold the free end portion 33 in its forwardly extending position. Conversely, when the portion 33 is swung rearwardly as shown in dotted outline in Fig. 6, the recesses and detents cooperate to latch the free end portion 33 in its rearwardly extending position.

The portion 33 may be provided with a fastening member for detachably securing a camera 40 to the light bar 22. As herein shown, the fastening member is a threaded bolt 41 which is secured to, but freely rotatable in, the free end portion 33. The bolt has a decorative plastic head 42 and its threaded shank is adapted to be received in the threaded well present on the bottom of most cameras today. Some threaded wells are located forwardly and others are located rearwardly of the base of the camera. Thus, by providing the forward and rearward movement of the free end portion 33, all types of current cameras can be accommodated and properly positioned relative to the lamps, and yet the light bar 22 can be kept extremely compact for carrying purposes.

When assembling the light bar 22 within the case 10, it is contemplated by the invention that the photographic lamps 25 need not be removed from their sockets. This result is obtained by providing members within the case 10 which securely anchor the lamp support 23 and maintain the lamps 25 in spaced relation with respect to the base 12 and side walls 13—16 of the case 10 when in carrying position.

To this end, the case 10 is provided with a pair of elongated supporting strips 43 and 44 which are spaced longitudinally of the case 10. The strips extend transversely across the case 10 and are secured at their opposite ends to a pair of opposed side walls 13, 14.

As best seen in Fig. 7, the central part of each of the strips 43, 44 is turned downwardly to form pairs of opposed shoulders 45, 46 and 47, 48. Thus, when the light bar 22 is positioned in the case 10, the front face of the lamp support 23 rests upon each of the strips 43 and 44 and suspends the lamps 25 above the base 12 of the case 10. The shoulders, of course, abut opposite sides of the light bar 23 to prevent lateral shifting of the light bar in the case during carrying.

Means are also provided in the case 10 to prevent longitudinal shifting of the light bar when in carrying position within the case. To this end, a U-shaped bracket 50 is riveted to the side wall 14 to provide a pair of inwardly projecting stop members 51, 52.

When the light bar 22 is to be placed within the case 10, the camera is removed, and the free end portion 33 is turned to its forwardly extending position as shown in Fig. 6. Next, the handle member 20 is unthreaded from the arm 31 of the camera bracket 28. In positioning the light bar 23 in the case 10, the free end portion 33 is directed downwardly and snugly fits between the two stop members 51 and 52 so that longitudinal movement of the light bar 22 is restricted when in carrying position. The handle can then be rethreaded upon the bracket 17 of the cover 11 so that a carrying member is provided for the case 10.

As best seen in Figs. 2 and 4, a piece of resilient material 53, such as rubber, is preferably secured to the inner face of the cover 11. Thus when the cover 11 is placed upon the case 10 and the fastening elements 21 are securely latched, the cover is pulled firmly down into position so that the resilient material 53 is compressed against the exposed face of the camera bracket 28 to further restrict shifting movement of the light bar 22. Furthermore, the resilient material 53 prevents upward movement of the light bar 23 in the case 10 so that the shoulders 45, 46 and 47, 48 and the stop members 51, 52 firmly hold the light bar against movement during carrying. Thus a carrying assembly is provided which is extremely compact and in which the lamps are completely protected even though they are not detached from their sockets.

The foregoing detailed description is given for clearness of understanding only and no unnecessary limitations should be understood therefrom for some modifications will be obvious to those skilled in the art.

I claim:

1. A carrying assembly for a photographic light bar, comprising: a rectangular case having a base and two pairs of opposed side walls, said case being open at its top and having a pair of longitudinally spaced, elongated supporting strips, said strips extending transversely of the case and being secured to one pair of the opposed side walls; a pair of inwardly projecting longitudinally spaced stop members secured to a side wall of said one pair; a light bar adapted to fit within the case in carrying position, said light bar including an elongated lamp support having a plurality of forwardly directed electrical sockets each adapted to receive a photographic lamp and to make an electrical connection with a source of electric current, the sockets being spaced so that the lamp support bears against and is supported by said pair of supporting strips to suspend the photographic lamps above the base, said lamp support being provided with a camera supporting bracket extending upwardly of the lamp support and having a movable free end portion adapted for detachably receiving a camera, said free end portion being adjustable between a forward and a rearward camera mounting position and being snugly received when in said forward position between the pair of stop members on the case; a rectangular cover for closing the top of the case, said cover being provided with a carrying handle on its outer surface and having a piece of resilient material adhered to its inner surface to firmly bear against the lamp support when the cover is on the case; and cooperating fastening means on said cover and said case for detachably securing the cover to the case and maintaining said resilient material in yielding engagement with the lamp support in the case.

2. A carrying assembly for a photographic light bar as specified in claim 1, in which the carrying handle is detachable from the cover, and the light bar is provided with means for receiving said carrying handle so that the carrying handle can be attached to said light bar and manually grasped to direct illumination from the lamps when the light bar is removed from the case.

3. A carrying assembly for a photographic light bar as specified in claim 1, in which the elongated supporting strips are each provided with transversely spaced shoulders for engaging the lamp support and limiting transverse movement of the light bar in the case.

4. A carrying assembly for a photographic light bar, comprising: a rectangular case having a base and two pairs of opposed side walls, said case being open at its top and having a pair of longitudinally spaced, elongated supporting strips, said strips extending transversely of the case and being secured to one pair of the opposed side walls; a light bar adapted to fit within the case in carrying position, said light bar including an elongated lamp support having a plurality of forwardly directed electrical sockets each adapted to receive a photographic lamp and to make an electrical connection with a source of electric current, the sockets being spaced so that the lamp support bears against and is supported by said pair of supporting strips to suspend the photographic lamps above the base, said lamp support being provided with a camera supporting bracket extending upwardly of the lamp support and having a movable free end portion adapted for detachably receiving a camera, said free end portion being adjustable between a forward and a rearward camera mounting position and being turned to said forward camera mounting position when the light bar is positioned in the case; abutment means secured to the case for bearing against said light bar to limit longitudinal shifting movement when in carrying position; a rectangular cover for closing the top of the case, said cover being provided with a carrying handle on its outer surface and having a piece of resilient material adhered to its inner surface to firmly bear against the lamp support when the cover is on the case; and cooperating fastening means on said cover and said case for detachably securing the cover to the case and maintaining said resilient material in yielding engagement with the lamp support in the case.

5. A carrying assembly for a photographic light bar as specified in claim 4 in which each of the elongated supporting strips is provided with a pair of opposed shoulders for snugly receiving the lamp support to limit lateral shifting movement of the light bar when in carrying position.

6. A carrying assembly for a photographic light bar, comprising: a case having a base, a first pair of opposed side walls and a second pair of opposed side walls, said case being open at its top and having a plurality of longitudinally spaced, elongated supporting strips each having an end secured to a side wall of said first pair; a light bar adapted to fit within the case in carrying position, said light bar including an elongated lamp support having a plurality of forwardly directed electrical sockets each adapted to receive a photographic lamp and to make an electrical connection with a source of electric current, the sockets being spaced so that the lamp support bears against and is supported by said supporting strips to suspend the photographic lamps above the base, said lamp support being provided with a camera-supporting bracket extending upwardly of the lamp support and having a movable free end portion adapted for detachably receiving the camera, said free end portion being adjustable between a forward and a rearward camera mounting position and being moved to said forward camera mounting position when the light bar is positioned within the case; a cover for closing the top of the case and having an inner face firmly bearing against the lamp support when the cover is on the case, said cover also being provided with a carrying handle on its outer face; and cooperating fastening means on said cover and said case for detachably securing the cover to the case to maintain the inner face of said cover in firm engagement with the lamp support in the case.

7. A carrying assembly for a photographic light bar, comprising: a case having a base, a first pair of opposed side walls and a second pair of opposed side walls, said case being open at its top and having a transversely extending supporting strip with its opposite ends secured to a side wall of said first pair; a light bar adapted to fit within the case in carrying position, said light bar including an elongated lamp support having a plurality of forwardly directed electrical sockets each adapted to receive a photographic lamp and to make an electrical connection with a source of electric current, the sockets being spaced so that the lamp support bears against and is supported by said supporting strip to suspend the photographic lamps above the base, said lamp support being provided with a camera-supporting member positioned above and attached to the lamp support and being movable between a forward position and a rearward position so as to accommodate a camera in either of said positions, said camera-supporting member being moved forwardly of its rearward position when the light bar is placed within the case in carrying position; a cover for closing the top of the case and having an inner face firmly bearing against the lamp support when the cover is on the case to cooperate with said supporting strip and firmly hold said lamp support against longitudinal and lateral shifting movement when the light bar is in carrying position; and cooperating fastening means on said cover and said case for detachably securing the cover to the case to maintain the inner face of said cover in firm engagement against the lamp support in the case.

8. A carrying assembly for a photographic light bar as specified in claim 7 in which resilient means are provided on the inner face of said cover to yieldingly bear against the lamp support and hold said lamp support against lateral and longitudinal shifting movement when the light bar is in carrying position.

9. A carrying assembly for a photographic light bar as specified in claim 7, in which the cover is provided with a carrying handle which is detachably secured to said cover, and the lamp support is provided with means for receiving said carrying handle so that the carrying handle can be attached to said lamp support and manually grasped to direct illumination from the lamps when the light bar is removed from the case.

10. A carrying assembly for a photographic light bar as specified in claim 7, in which a pair of inwardly projecting, longitudinally spaced stop members are secured to a side wall of said first pair of side walls, said stop members being positioned so as to snugly receive the camera-supporting member when in its forward position to restrain said lamp support against longitudinal movement and to properly locate said light bar in carrying position.

11. A carrying assembly for a photographic light bar as specified in claim 7, in which said case is provided with abutment means positioned to cooperate with said light bar to limit shifting movement when in carrying position.

12. A carrying assembly for a photographic light bar as specified in claim 7, in which the camera-supporting member is pivotally secured to the lamp support to afford said movement between a forward position and a rearward position.

References Cited in the file of this patent

UNITED STATES PATENTS

| | | |
|---|---|---|
| 2,285,868 | Muller | June 9, 1942 |
| 2,530,912 | Secofsky et al. | Nov. 21, 1950 |
| 2,532,075 | Powell | Nov. 28, 1950 |
| 2,614,471 | Markowitz | Oct. 21, 1952 |